(12) United States Patent
Clerambourg et al.

(10) Patent No.: US 12,251,917 B2
(45) Date of Patent: Mar. 18, 2025

(54) METHOD FOR MANUFACTURING AN ACOUSTIC PANEL

(71) Applicant: SAFRAN CERAMICS, Le Haillan (FR)

(72) Inventors: Aurélia Clerambourg, Moissy-Cramayel (FR); Eric Bouillon, Moissy-Cramayel (FR); Eric Philippe, Moissy-Cramayel (FR)

(73) Assignee: SAFRAN CERAMICS, Le Haillan (FR)

( * ) Notice: Subject to any disclaimer, the term of this patent is extended or adjusted under 35 U.S.C. 154(b) by 734 days.

(21) Appl. No.: 17/260,006

(22) PCT Filed: Jul. 16, 2019

(86) PCT No.: PCT/FR2019/051782
§ 371 (c)(1),
(2) Date: Jan. 13, 2021

(87) PCT Pub. No.: WO2020/016520
PCT Pub. Date: Jan. 23, 2020

(65) Prior Publication Data
US 2021/0323295 A1    Oct. 21, 2021

(30) Foreign Application Priority Data

Jul. 17, 2018 (FR) .................................. 1856607

(51) Int. Cl.
*B32B 37/14* (2006.01)
*B29C 45/16* (2006.01)
(Continued)

(52) U.S. Cl.
CPC .............. *B32B 37/146* (2013.01); *B32B 3/12* (2013.01); *B32B 5/02* (2013.01); *B32B 7/12* (2013.01);
(Continued)

(58) Field of Classification Search
CPC .......... B32B 37/146; B32B 3/12; B32B 5/02; B32B 7/12; B32B 2307/102;
(Continued)

(56) References Cited

U.S. PATENT DOCUMENTS 2,960,197 A * 11/1960 Langhans .............. B21D 47/00
428/116
4,034,135 A *  7/1977 Passmore ................ E04C 2/423
428/184

(Continued)

FOREIGN PATENT DOCUMENTS

FR        2701665 A1    8/1994
FR        3044963 A1    6/2017
(Continued)

OTHER PUBLICATIONS

L&L Special Furnace Co, Inc., "What are Ceramic Matrix Composites?" Aug. 30, 2018, https://llfurnace.com/blog/what-are-ceramic-matrix-composites/. (Year: 2018).*

(Continued)

*Primary Examiner* — Christopher W Raimund
(74) *Attorney, Agent, or Firm* — Christensen O'Connor Johnson Kindness PLLC

(57) ABSTRACT

A method for manufacturing a composite panel is described. The method includes producing a first wall, a second wall, a third wall and a fourth wall from composite materials including an oxide matrix and long oxide fibres; from the first and second walls, producing a cellular core including a plurality of cells, each cell including a first end and an opposing second end, covering the first and second ends of the cells of the cellular core with the third wall and the fourth wall, respectively, so as to close the ends of said cells.

9 Claims, 2 Drawing Sheets

(51) Int. Cl.
| | |
|---|---|
| *B29C 51/00* | (2006.01) |
| *B29C 65/00* | (2006.01) |
| *B32B 3/12* | (2006.01) |
| *B32B 5/02* | (2006.01) |
| *B32B 7/12* | (2006.01) |
| *C04B 35/01* | (2006.01) |
| *C04B 35/117* | (2006.01) |
| *C04B 35/18* | (2006.01) |
| *C04B 35/80* | (2006.01) |
| *G10K 11/168* | (2006.01) |
| *G10K 11/172* | (2006.01) |

(52) U.S. Cl.
CPC ............ *C04B 35/117* (2013.01); *C04B 35/18* (2013.01); *C04B 35/80* (2013.01); *G10K 11/168* (2013.01); *G10K 11/172* (2013.01); *B29C 2045/1692* (2013.01); *B29C 51/00* (2013.01); *B29C 66/72525* (2013.01); *B29C 66/7461* (2013.01); *B32B 2307/102* (2013.01); *B32B 2307/518* (2013.01); *B32B 2605/18* (2013.01); *C04B 35/01* (2013.01)

(58) Field of Classification Search
CPC .......... B32B 2307/518; B32B 2605/18; B32B 5/022; B32B 18/00; B32B 2315/02; C04B 35/117; C04B 35/18; C04B 35/80; C04B 35/01; C04B 2235/483; C04B 2235/5264; C04B 2237/06; C04B 2237/062; C04B 2237/064; C04B 2237/38; C04B 2237/76; C04B 37/005; G10K 11/168; G10K 11/172; B29C 51/00; B29C 66/72525; B29C 66/7461; B29C 2045/1692; Y02T 50/60; F05D 2250/283; F05D 2300/603; B64D 33/06; F02K 1/822
See application file for complete search history.

(56) References Cited

U.S. PATENT DOCUMENTS

| | | | | |
|---|---|---|---|---|
| 4,514,240 | A * | 4/1985 | Heraud | B32B 18/00 |
| | | | | 427/249.17 |
| 4,689,870 | A * | 9/1987 | Mieyal | E04C 2/36 |
| | | | | 52/665 |
| 5,490,892 | A | 2/1996 | Castagnos et al. | |
| 2009/0263627 | A1 | 10/2009 | Hand et al. | |
| 2013/0167374 | A1* | 7/2013 | Kirby | H04W 4/023 |
| | | | | 428/317.9 |
| 2017/0334791 | A1* | 11/2017 | Podgorski | C04B 35/185 |
| 2018/0290330 | A1 | 10/2018 | Caruel et al. | |

FOREIGN PATENT DOCUMENTS

| | | | | |
|---|---|---|---|---|
| SU | 1743891 A1 * | 6/1992 | | |
| WO | WO-2016102842 A1 * | 6/2016 | ............ | B28B 3/006 |
| WO | WO-2017103390 A1 * | 6/2017 | ............ | B28B 1/002 |

OTHER PUBLICATIONS

International Search Report mailed Nov. 5, 2019, issued in corresponding International Application No. PCT/FR2019/051782, filed Jul. 16, 2019, 2 pages.
Written Opinion of the International Searching Authority mailed Nov. 5, 2019, issued in corresponding International Application No. PCT/FR2019/051782, filed Jul. 16, 2019, 6 pages.
Written Opinion of the International Searching Authority mailed Nov. 5, 2019, issued in corresponding International Application No. PCT/FR2019/051782, filed Jul. 16, 2019, 7 pages.
International Preliminary Report on Patentability mailed Jan. 19, 2021, issued in corresponding International Application No. PCT/FR2019/051782, filed Jul. 16, 2019, 1 page.

* cited by examiner

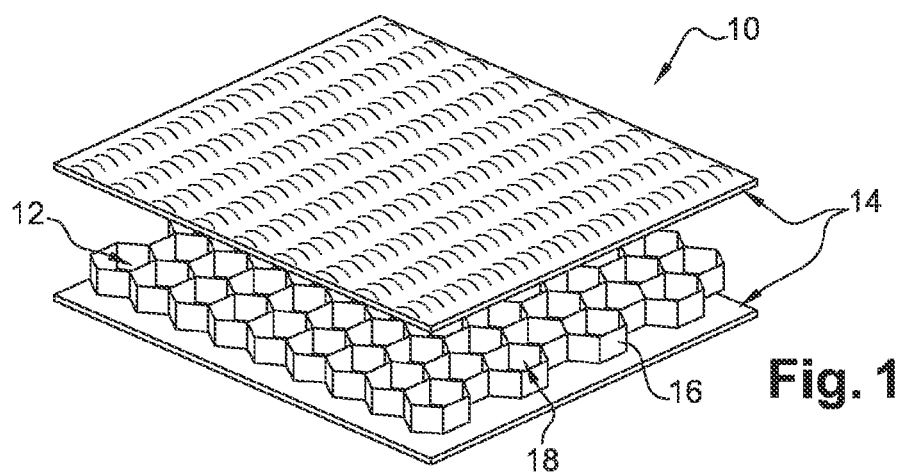
Fig. 1
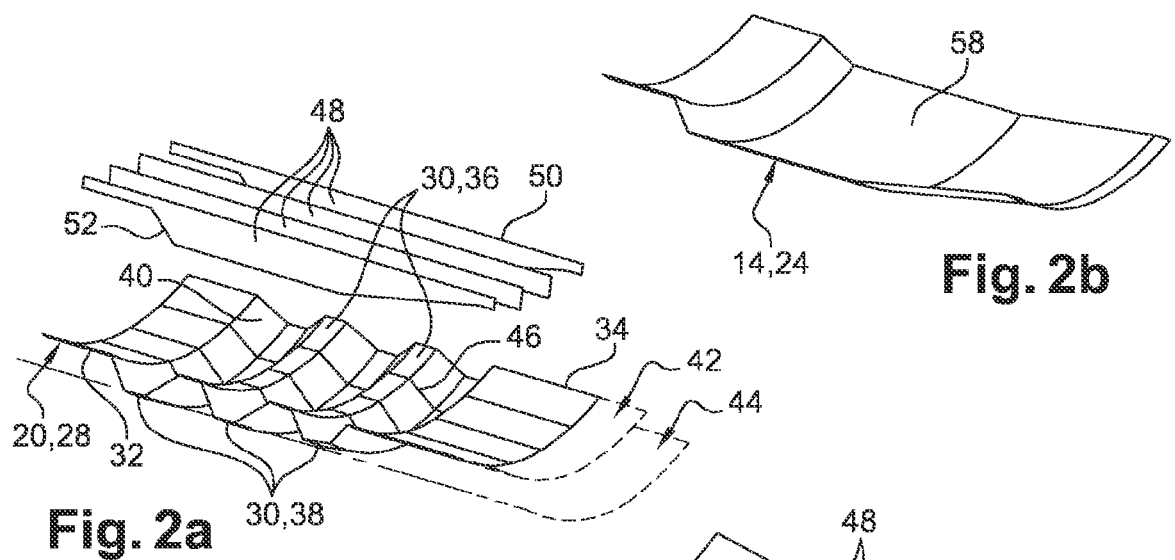
Fig. 2a
Fig. 2b
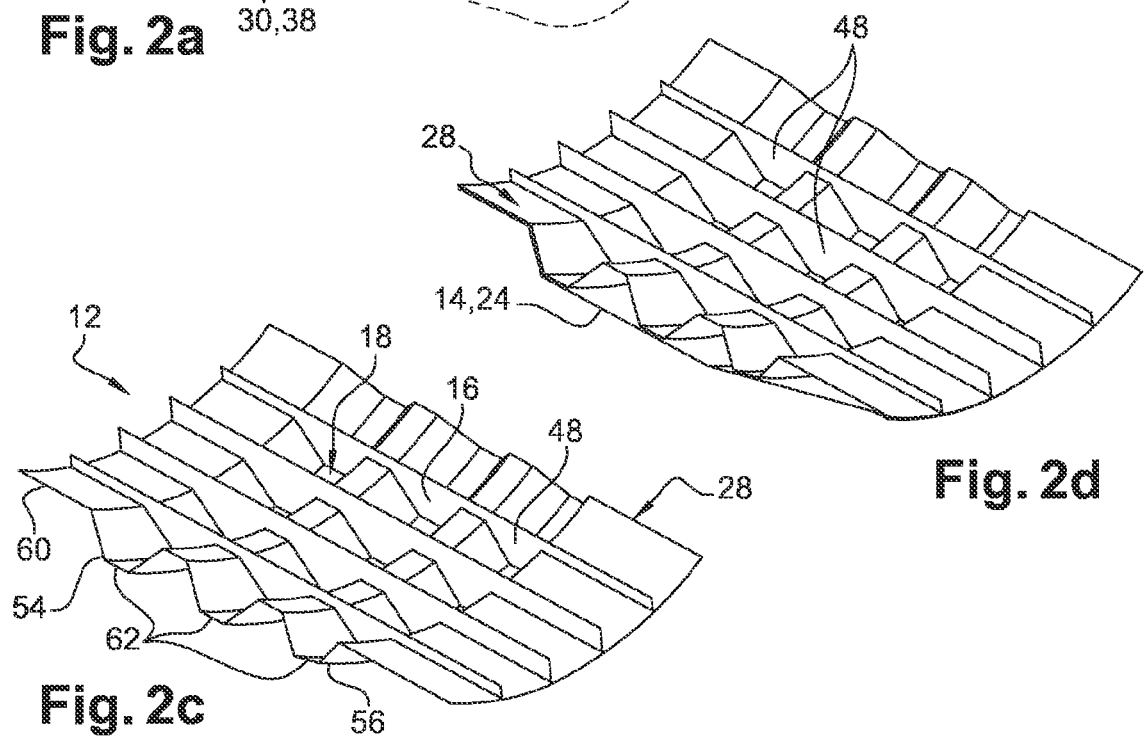
Fig. 2c
Fig. 2d

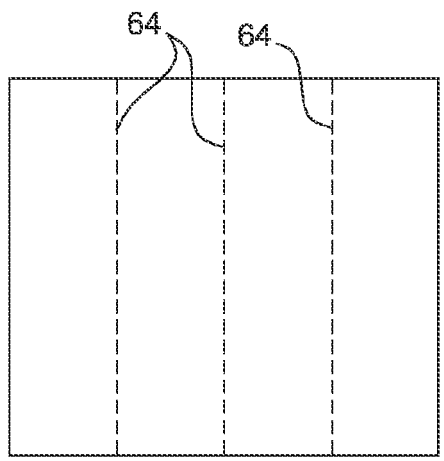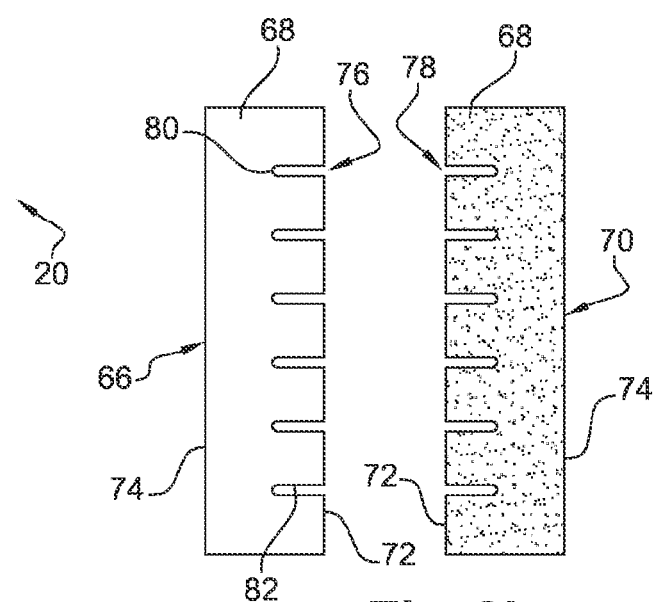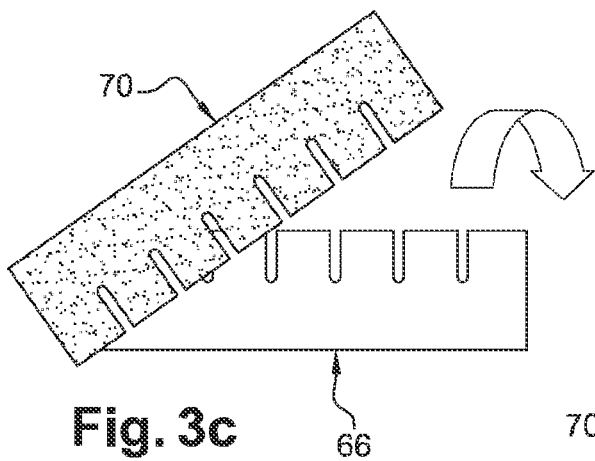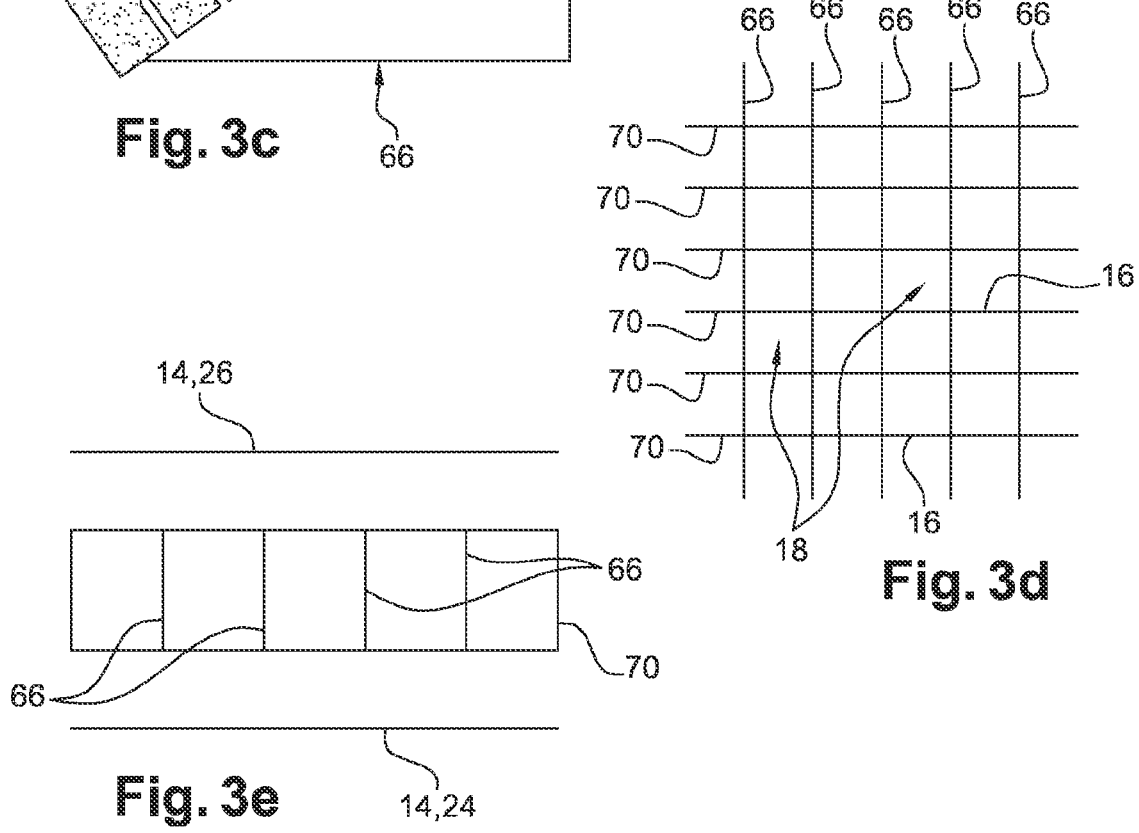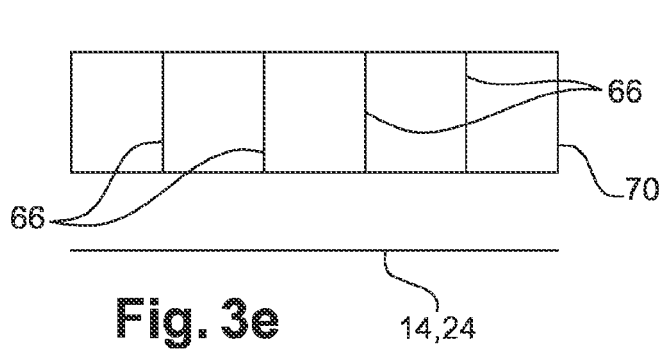

METHOD FOR MANUFACTURING AN ACOUSTIC PANEL

FIELD OF THE DISCLOSURE

Embodiments of the present disclosure relate to the field of panels, in particular those intended to equip the hot gas ejection zones of a turbomachine, and more precisely of an aircraft turbojet engine. The disclosure concerns more particularly a method of manufacturing a honeycomb core.

BACKGROUND OF THE DISCLOSURE

Typically, a turbomachine has aerodynamic guide surfaces for the flow of the ejected hot gases, which can be subjected to high temperatures of up to 700° C. and in some cases up to 800° C.

In order to reduce the noise emitted by the turbojet engine during operation, it is known to produce aerodynamic guide surfaces with acoustic panels 10 comprising a sandwich-type structure consisting of a honeycomb core 12 inserted between two covering walls, also called skins 14. The skins 14 of these panels 10 are made of metallic materials or ceramic matrix composites. The honeycomb core 12 is made of metallic, monolithic materials in the form of compacted powder or ceramic matrix composites with short fibers. Thus, in the case of a metallic (titanium, nickel, Inconel alloys, etc.) or monolithic core, core 12 is free of reinforcing fibers. In cases where the core is made of ceramic matrix composites, the composite material is provided with short fibers.

The panels are usually made of titanium alloy. If it incorporates an acoustic treatment, which is generally carried out by a Helmholtz resonator-type structure, i.e. introduction between two skins 14 of a honeycomb core 12 on the basis of titanium strips forming the transverse partitions 16 of the cell 18. The honeycomb core 12 is usually soldered to both skins 14. The structural characteristics of the honeycomb core 12 (cell sizes 18, wall thickness 16, wall height 16) are defined to optimize sound attenuation.

The potential increase in gas ejection temperature for future aircraft engines may limit the use of a material such as titanium. Thus, a material resistant to higher temperatures must be identified. The state of the art solution is to switch to a nickel-based alloy, which has a much higher temperature limit than titanium.

However, the use of a nickel-based alloy implies a significant increase in mass compared to a titanium-based alloy panel. In addition, the production of a nickel-based alloy panel is more complex than a titanium-based alloy panel.

The honeycomb core 12 has transverse partitions 16 forming a large number of cells 18, which may in particular have a rectangular cross-section or have a honeycomb shape with a hexagonal cross-section.

Finally, panels comprising a honeycomb core 12 made of composite materials with short fibers have a low mechanical resistance.

In addition, the metallic materials making up the panels 10 have temperature limitations that can be reached during operation and have a significant thickness and mass. Oxidation causes chemical degradation of metallic materials.

Silicon carbide-based ceramic matrix composites such as Cerasep® are functional in an environment with temperatures up to 1,000° C. These materials can thus meet the requirements related to the constraints of the hot gas ejection zones at the rear body of the turbomachine. However, the use of such materials to make acoustic panel 10 is not considered since the cost of making a panel 10 would be prohibitive.

The disclosure aims to produce an acoustic panel 10 made of a material that overcomes the above-mentioned problems at a lower cost.

SUMMARY OF THE DISCLOSURE

Embodiments of the present disclosure relate first of all to a process for manufacturing a composite panel, in particular in a turbomachine, the process being characterized in that it comprises the following steps:
  a) making a first wall, a second wall, a third wall and a fourth wall of composite materials comprising an oxide matrix and long oxide fibers,
  b) from the first and second walls, forming a honeycomb core having a plurality of cells, each cell having a first end and an opposite second end,
  c) covering the first and second ends of the cells of the honeycomb core with the third wall and the fourth wall, respectively, so as to close the ends of the cells.

Panels made entirely of composite materials having an oxide matrix and long oxide fibers have a better mechanical resistance at temperatures above 700° C. than the same panel made of a titanium-based alloy and a lower mass than the same panel made of a nickel-based alloy. Similarly, panels with a honeycomb core comprising short fibers have a lower mechanical strength than panels with a honeycomb core comprising long fibers.

Long fibers will be distinguished from short fibers by their ability to form a textile preform using unidirectional or biaxial fibers. In contrast to long fibers, short fibers do not allow the manufacture of such textile preforms. In the case of the present disclosure, the so-called long fibers are several kilometers long.

The panels consist of a honeycomb core covered by a third and a fourth wall, also called the lower and upper skin, so as to seal the openings of the cells. When the acoustic panel according to the disclosure is integrated into an exhaust casing of a turbomachine, the water vapor present does not impact the structure of the panel since the oxide matrix and the oxide fibers are not susceptible to oxidation. This increases the service life of composite panels with an oxide matrix and long oxide fibers.

The panel concerned could be an acoustic panel designed to reduce noise pollution. In this case, at least one of the third wall and the fourth wall has perforations, each of the perforations opening into a cell. Each perforation opens into a cell and thus forms a Helmholtz resonator.

In a first embodiment of the disclosure, the honeycomb core is obtained in step b) from the following steps:
  i. forming the first wall so as to obtain a corrugated wall having alternating first apex portions and second apex portions interconnected by apex connecting portions,
  ii. cutting slots in the first apex and apex connecting portions of the first wall,
  iii. making cuts in the second wall so as to obtain a plurality of strips,
  iv. inserting the strips into the slots of the first wall so as to delimit a plurality of cells.

In this first embodiment, the first wall is formed so as to obtain a corrugated sheet metal whose succession of apex portions and apex connecting portions extends in an axial direction. This forming of the first wall can be obtained by thermoforming or by forming with the aid of an impression, during the step of making the first wall. Advantageously, the second apex portions do not include slots, which allows the strips to abut against the second portions.

The slots are cut in the corrugated sheet in a substantially axial direction so as to pass through the first apex portions, the adjacent apex connecting portions of the first apex portions and a part of the downstream end of the corrugated sheet and the apex connecting portion connecting it to the second apex portion of the corrugated sheet. Such forming of the first wall makes it possible to simply arrange strips, forming partitions, in the slots so as to come into abutment with the second apex portions. The arrangement of the strips in the slots of the corrugated sheet forms cells which together define the honeycomb core. Advantageously, each cell of this first embodiment is closed off, on the one hand, by one of the apex portions and, on the other hand, by the bands and the apex connecting portions, so that only the end of the cell opposite the apex portion needs to be closed off with a skin.

Advantageously, the first embodiment of the composite acoustic panel can include a step consisting in applying an adhesive, preferably ceramic glue, at the junction areas of the first wall and the strips.

It is preferable to apply an adhesive, such as ceramic glue, at the junctions of the corrugated sheet and the partitions, formed by the strips inserted in the slots of the corrugated sheet, so as to stiffen the structure of the honeycomb core.

In a second embodiment of the disclosure, the honeycomb core is obtained from the following steps:
  i. cutting the first wall and the second wall into first and second strips of the same width, respectively, each having a first and a second substantially parallel edge,
  ii. in the first edges of each of the first strips and the second strips, making first parallel slots and second parallel slots, respectively,
  iii. making the honeycomb core by fitting the first strips in the second slots of the second strips and the second strips in the first slots of the first strips, so that the bottoms of the first slots are in contact with the bottoms of the second slots.

The interlocking of the first and second strips at the first and second slots, respectively, allows the simple and fast production of a honeycomb core. The honeycomb core comprises rows of cells having a substantially rectangular or square shape and having at least two opposite sides which are substantially parallel and of equal length. Optionally, the cells, obtained by interlocking the first and second strips, are substantially square in shape and thus comprise four sides of substantially equal length and substantially parallel opposite sides.

In one embodiment variant, the first and second strips can have the same width.

Advantageously, the width of the first strips, the width of the second strips and the depth of the slots are dimensioned so that the first edges of the first strips are flush with the second edges of the second strips and/or the second edges of the first strips are flush with the first edges of the second strips.

The fact that all the first edges of the first strips are flush with the second edges of the second strips and/or all the second edges of the first strips are flush with the first edges of the second strips facilitates the necessary machining of the third wall and/or fourth wall to form the skins covering the honeycomb core on both sides. Preferably, all first edges of the first strips are flush with the second edges of the second strips and all second edges of the first strips are flush with the first edges of the second strips, thereby facilitating the machining of the third wall and the fourth wall constituting the skins which enclose the honeycomb core.

In a practical embodiment, the first strips and the second strips have the same width and the first and second slots of the first and second strips, respectively, extend, starting from the first edge, over half the width of the first and second strips. Thus, in the preferred case, where the slots extend in a direction parallel to the width direction, the first edges of the first strips are flush with the second edges of the second strips and all second edges of the first strips are flush with the first edges of the second strips.

Advantageously, the second embodiment of the composite acoustic panel can include a step consisting of applying an adhesive, preferably ceramic glue, to the areas where the first and second strips meet.

It is preferable to apply an adhesive to the junction areas of the first and second strips in order to stiffen the honeycomb core structure. When the first and second strips are nested, adhesive can be applied at the intersections of the first and second strips. Optionally, the adhesive is also applied to the sides and bottom of each of the first and second slots, prior to nesting of the first and second strips.

Advantageously, the method of manufacturing the composite acoustic panel according to the first method of manufacture and/or the second method of manufacture may comprise a step consisting of applying an adhesive, preferably ceramic glue, to the areas of junctions of the honeycomb core with at least one of the third wall and the fourth wall. Thus, the third wall and the fourth wall are joined to the honeycomb core.

The adhesive used is preferably a ceramic glue or an oxide preceramic resin. The ceramic adhesive can be made up of oxidic ceramic fillers (most often alumina) and a set of fugitive binders. The ceramic adhesive can also be made up of ceramic fillers and a mineral polymer type binder (aluminum metaphosphate) or an alumina sol or sol-gel, silica sol (Ludox). Finally, the ceramic glue can be made of a ceramic precursor of the family of polysiloxanes that can be filled with alumina.

The resulting composite acoustic panel is preferably made of composite material comprising an oxide matrix and long oxide fibers in the form of a biaxial or unidirectional fiber web since their cost, weight and thickness are lower than that of a three-dimensional weave.

Preferably, the cells of the honeycomb core have a rectangular or square shape, and this regardless of the embodiment chosen from the two previously mentioned.

According to a particular embodiment, the at least one of the first wall, the second wall, the third wall and the fourth wall is obtained by thermoforming.

In another special embodiment, at least one of the first wall, the second wall, the third wall and the fourth wall is obtained by forming with the aid of an impression.

Preferably, the process comprises at least one debonding step followed by a sintering step, the debonding and sintering steps being able to take place after at least one of the following steps:
  obtaining one of the first, second, third or fourth walls,
  cutting strips,
  assembling the strips in the slots, and
  bonding the third wall (24) and the fourth wall (26) to the honeycomb core (12).

In one particular embodiment, the process includes a step of debonding a first binder binding the fibers together. The removal of this first binder can be carried out in an impression which is kept closed and into which a slurry comprising alumina powder or alumino-silicate and a second binder is introduced. The introduction of slurry can be done by injection or infusion.

DESCRIPTION OF THE DRAWINGS

The disclosure will be better understood and other details, characteristics and advantages of the disclosure will appear when reading the following description, which is given as a non-limiting example, with reference to the attached drawings.

FIG. 1 is a perspective view of an acoustic panel for a turbomachine according to the prior art;

FIGS. 2a to 2d illustrate the various making steps of an acoustic panel according to a first embodiment of the disclosure; and FIGS. 3a to 3e illustrate the various making steps of an acoustic panel according to a second embodiment of the disclosure.

DETAILED DESCRIPTION

In the following detailed description, the term "fibers" refers to "long oxide fibers". The term "axial" means an axial direction oriented substantially parallel to the longitudinal axis of the turbomachine when the acoustic panel 10 according to the disclosure is mounted in a turbomachine.

FIG. 1 relates to an acoustic panel 10 of the prior art described above.

Reference is now made to FIGS. 2a to 2d, representing the process of obtaining an acoustic panel 10 in ceramic matrix composite material according to the first embodiment.

The first, second, third and fourth composite walls 20, 22, 24, 26 are obtained, respectively, from a biaxial fiber web or a unidirectional fiber web.

In the case of biaxial fiber webs, the web is coated with a slurry so that the slurry penetrates into the porosities of the web and thus forms a composite wall. The slurry is filled with alumina powder and a binder, the binder may be a thermoplastic or a fugitive thermoset or a preceramic oxide thermoset. The binder allows the coated biaxial fiber web to be stiffened following heat treatment. Following a coating, the biaxial fiber web is passed under a press or vacuum tarp to ensure the compaction and penetration of the slurry into the fiber web. If the binder used is a fugitive binder, then the coated sheet is loosened, in the form of a heat treatment, so that the binder is removed from the wall. A fugitive binder is intended to be removed by a debonding process.

The step of coating a slurry can be replaced by an infusion or injection step.

In the case where the web is composed of unidirectional fibers, the unidirectional fibers are bound to each other by means of a first binder, commonly known as a "binder", ensuring cohesion between them. The unidirectional fiber web is draped directly into the impression in the desired shape. This unidirectional fiber web is undergoing debonding. This debonding creates porosities. The slurry is injected onto the unidirectional fibers once the impression is closed. The slurry is injected via an STM (Slurry Transfer Molding) process and will become lodged between the unidirectional fibers of the unidirectional fiber web. The slurry is filled with an alumina or alumino-silicate powder and a thermoplastic binder, typically PVA. The alumina or alumino-silicate of the slurry forms the oxide matrix of the composite material and the thermoplastic ensures cohesion between the unidirectional fibers. The binder of the slurry is used to hold the alumina powder grains or alumino-silicate together. The binder prevents the alumina powder or the alumino-silicate from crumbling and consequently the material is not very durable or even does not hold up after injection. This binder will subsequently be removed at a later temperature during sintering, the powder grains being sufficiently solid to ensure the material's holding power. This injection of slurry also allows the unidirectional fiber web to take the shape of the impression. Thus, the wall obtained after injection directly presents the desired shape.

Alternatively, the slurry injection step can be replaced by an infusion step.

It should be noted that unidirectional fiber webs can also be thermoformed, thanks to the first binder present in the unidirectional fiber web. The first binder is heated to allow the unidirectional fiber web to conform to the shape of the impression. Once the thermoforming has been completed, the first binder is removed by circulating hot water in the closed cavity. When the first binder is removed, the impression is kept closed and a slurry comprising alumina powder or alumino-silicate and binder is injected under pressure onto the unidirectional fiber web.

Preferably, unidirectional fiber webs have a thickness of between 0.1 and 0.3 mm and biaxial fiber webs have a thickness of between 0.3 and 0.6 mm.

Corrugated sheet 28, shown in FIGS. 2a, 2c and 2d, is obtained by forming the first wall 20 using one of the processes described above.

Optionally, the walls can also be obtained by thermoforming biaxial fiber webs previously coated with an injected slurry using an STM process or by infusion. The fugitive binder can be replaced by a preceramic polysiloxane type binder, preferably powder-filled. If the binder is of the polysiloxane type, the coated biaxial fiber web is thermoformed and then pyrolysed to convert the polysiloxane into ceramic oxide.

When the acoustic panel 10 is mounted on the casing of the turbomachine, the width of the corrugated wall 28, otherwise known as the corrugated sheet, designates the circumferential component and the direction normal to the apex portions 30, and more generally to the corrugated sheet 28, designates the radial direction. Corrugated sheet 28 has a curved profile in the direction of its width, so as to define a ring sector. Corrugated sheet 28 comprises, between its upstream axial end 32 and downstream axial end 34, a succession of first and second apex portions 36, 38 and apex connecting portions 40 in an axial direction. Each first apex portion 36 extends in a substantially axial direction along a cylindrical surface as illustrated in FIG. 42. Each second apex portion 38 extends in a substantially axial direction along a cylindrical surface as shown in FIG. 44. Cylindrical surfaces 42, 44 are approximately parallel to each other and are therefore not confused. Each apex linkage portion 40 extends to link a first apex portion 36 to a second apex portion 38.

Thus, in FIG. 2a, the first portions 36 of the apices are all aligned along the cylindrical surface 42 and the second portions 38 of the apex along the cylindrical surface 44. Preferably, the upstream axial ends 32 and downstream axial ends 34 of the corrugated sheet 28 form first apex portions 36 also extending along the cylindrical surface 42.

The first apex portions 36, respectively the second apex portions 38, together with the connecting portions 40 of adjacent apices, define a trapezoidal shape without its largest base. The small base is defined by a first apex portion 36, respectively, and a second apex portion 38. The two non-parallel sides of the trapezium are defined by the apex connecting portions 40 connected on either side to the apex portion 36, 38 forming the small base.

Each first apex portion 36 and each second apex portion 38 and each apex connecting portion 40 extends across the entire width of the corrugated sheet 28 along the curvature of the curved profile so that the corrugated sheet 28 has a substantially corrugated shape and the direction of the corrugations is along the axial axis.

The corrugated sheet 28 is cut so as to have slots 46 extending in the axial direction and opening in a direction normal to the corrugated sheet. The slots 46 are cut in the corrugated sheet 28 in a substantially axial direction through first apex portions 36, connecting portions 40 of adjacent apex portions of the first apex portions 36, a part of the downstream end 34 of the corrugated sheet 28 and the connecting portion 40 connecting it to the second apex portion 38. Each of the slots 46 is intended to receive a strip 48 cut from the second wall 22.

It should be noted that the cuts of the slots 46 can be made either before sintering in the case of the use of a polysiloxane, or after polymerization of the latter. The cutting of the strips 48 can also be carried out after polymerization of a polysiloxane as well as the assembly of the whole. In this case, pyrolysis of the entire system will be carried out. It is also possible to glue the two skins 14 at the polymerized stage and thus simultaneously carry out the pyrolysis of the polysiloxane constituting the acoustic partitions 16 and the sintering of the alumina matrix of the skins 14.

In the case of the use of fugitive first binders, it is preferable to carry out the operations of cutting the slots, cutting the strips 48, assembling the complex, gluing the skins 14 at a stage where the unitary elements are pre-sintered. Once the complex has been fully assembled, the final sintering will be carried out to ensure the structural cohesion of the whole.

The strips 48, once inserted, thus extend in a normal direction with respect to the corrugated sheet 28 and partition widthwise along the bend, the first and second portions 36, 38 of the top.

The second wall 22 is cut so as to form substantially identical strips 48 having a width of approximately 10 mm. This cutting can be mechanical, water jet or laser. Each strip 48 comprises a first straight edge 50 extending substantially axially from the upstream end 32 to the downstream end 34 of the corrugated sheet 28 so as to project in a direction normal to the corrugated sheet 28 from the first apex portions 36, and the upstream end 32 and downstream end 34 of the corrugated sheet 28, when the strips are inserted. When the acoustic panel 10 is mounted on the turbomachine housing, the direction of the protrusion corresponds to the radial direction, i.e. radially inwards. The second edge 52 of each of the strips 48 extends opposite the first edge 50 and conforms to the shape of the upstream end 32 and the apex connecting portion 40 connecting the upstream end 32 of corrugated sheet 28 and a second apex portion 38. Starting from the downstream end 54 of the above-mentioned apex connecting portion 40, the second edge 52, of strip 48, extends axially, parallel to the first edge 50, so as to conform to the shape of the second apex portions 38 and to abut the latter, when strips 48 are inserted. Starting from the downstream end 56 of the second crown portion 38 connected to the downstream end 34 of the corrugated sheet 28 by a crown connecting portion 40, the second edge 52 of the strip 48 extends downstream in an axial direction and towards the first edge 50. When the spacing between the first and second edges 50, 52 is identical to that at the upstream end 34, the first edge 50 and the second edge 52 extend parallel in an axial direction so that the second edge 52 follows the shape of the downstream part 36 of the corrugated sheet 28.

FIG. 2b shows the third wall 24 forming the outer skin, otherwise known as the first skin 14 that has been shaped to be curved. The first curved skin 14 also includes a profile curved in the direction of its width to match the curved profile of the corrugated sheet 28. The first curved skin 14 extends the same axial distance as the corrugated sheet 28. Axially, the first skin 14 is formed to conform to the shape of the corrugated sheet 28 on the portions comprising the upstream end 34 and the second apex portions 38 of the corrugated sheet 28. Starting from the downstream end 56 of the second apex portion 38 connected to the downstream end 34 of the corrugated sheet 28 by an apex connecting portion 40, the first curved skin 14 is shaped so as to follow the shapes of the second edges 52 of the strips 48 inserted in the corrugated sheet 28.

FIG. 2c shows the honeycomb core 12 consisting of corrugated sheet 28 and strips 48 inserted in slots 46 of corrugated sheet 28. Each cell 18 of the honeycomb core 12 defined by a first apex portion 36 opens radially outwards when acoustic panel 10 is mounted in the turbomachine. Respectively, each cell 18 of the honeycomb core 12 defined by a second apex portion 38 opens radially inwards, when acoustic panel 10 is mounted in the turbomachine.

When strips 48 forming partitions 16 are inserted into slots 48 of corrugated sheet 28, it is preferable to apply adhesive at the junction areas of corrugated sheet 28 and strips 48. These junction zones are defined by the ends of slots 46. Applying adhesive to the joint areas will stiffen the honeycomb core 12.

Optionally, the adhesive can be applied at the ends of the slots 46 intended to come into contact with the strips 48, before the strips 48 are inserted.

When the honeycomb core 12 is formed and stiffened, the third 24 wall and the fourth wall (not shown), forming the outer and inner skins 14, otherwise known as the first skin and second skin of the acoustic panel 10, are fixed, in a direction normal to the corrugated sheet 28, on either side of the honeycomb core 12, so as to enclose the cells 18.

The second skin (not shown), obtained from the fourth wall 26, covers the side of the honeycomb core 12 opposite that covered by the first skin, obtained from the third wall 24. The second skin extends circumferentially around the entire circumference of the acoustic panel 10 and longitudinally from the upstream end to the downstream end of the first skin. The second skin is shaped so as to be adhered to the honeycomb core 12 and the first skin arranged radially outside the honeycomb core 12 upstream and downstream of the honeycomb core 12.

To ensure the attachment of the skins 14 to the honeycomb core 12, an adhesive is applied to surface 58 of skin 14 coming into contact with the first and second portions 36, 38 of the top of the honeycomb core 12. Alternatively, or additionally, the adhesive is applied to surface 60 of the upstream end 34 of the corrugated sheet 28, surfaces 62 of the second apex portions 38 and the second edges 52 of the strips 48, at the downstream end 36 of the corrugated sheet 28. The surfaces 60, 62 of the upstream end 32 and the second portions 38 of the top and the second edges 52 of strips 48 are opposite the skin 14 formed by the third wall 24. The adhesive used is preferably pre-ceramic oxide resin or ceramic glue, as described above.

When the skins 14 are fixed, the acoustic panel 10 according to the first embodiment is obtained.

Preferably, when the corrugated sheet 28, the strips 48 forming the partitions 16 of the cells 18 of the honeycomb core 12, the skins 14 are respectively obtained, debonding and pre-sintering can be carried out.

Debonding is carried out to remove the slurry from the aforementioned pieces obtained using the first, second, third and fourth walls 20, 22, 24, 26. This slurry is removed during the temperature rise in the pre-sintering cycle.

Pre-sintering is carried out at a temperature of approximately 1,000 to 1,100° C. to consolidate the material. At this temperature, the grains of alumina powder create bridges between them giving the material strength.

Optionally, these debonding and pre-sintering steps can also be carried out after assembly of the strips 48 in the slots 46 of the corrugated sheet 28 or after gluing the skins 14 to the honeycomb core 12.

FIGS. 3a to 3e illustrate an acoustic panel according to a second embodiment of the disclosure.

In the second embodiment of the composite acoustic panel 10, as in the first embodiment, the first, second, third and fourth composite walls 20, 22, 24, 26 are obtained respectively from a biaxial fiber fleece or a unidirectional fiber fleece.

FIG. 3a shows the first composite wall 20 obtained after coating and pressing or vacuum forming. Cut-out areas 64 of the first wall 20, in the form of parallel dashed lines, so as to form first strips 66, are illustrated. This cutting can be mechanical, by water jet, or laser. The first strips 66 have a roughly rectangular shape. The width 68 of each first strip 66 is of the order of 10 mm.

The second wall 22 is obtained by the same process as the first wall 20 and is also cut into second strips 70 having the same characteristics as the first strips 66.

Optionally, the first and second strips 66, 70 can be obtained from the first wall 20 and/or the second wall 22.

The first and second strips 66, 70 each comprise a first parallel edge 72 and a second parallel edge 74 defining the length of the first and second strips 66, 70. The first and second edges 72, 74 of the first and second strips 66, 70 are spaced apart so as to define the width 68 of the first and second strips 66, 70.

FIG. 3b illustrates a cutting of first slots 76 in the first strips 66 and respectively second slots 78 in the second strips 70. The first and second slots 76, 78 extend respectively in a direction parallel to the width 68 of the first and second strips 66, 70 from their respective first edge 72. The first and second slots 76, 78 each comprise a bottom 80 and two flanks 82 extending parallel on either side of the bottom 80. Each of the first and second slots 76, 78 extends respectively over half the width 68 of the first and second strips 66, 70. The first and second strips 66, 70 with first and second slots 76, 78 respectively form a comb. The first slots 76 of the first strips 66 are equally spaced. The second slots 78 of the second strips 70 are equally spaced at equal distances from each other.

FIG. 3c shows an interlocking of the first strips 66 in the second slots 78 of the second strips 70 and an interlocking of the second strips 70 in the first slots 76 of the first strips 66, so that the bottom 80 of the first slots 76 is in contact with the bottom 80 of the second slots 78.

The first slots 76 of the first strips 66 being equally spaced from each other, and likewise for the second slots 78 of the second strips 70. All first strips 66 are substantially identical and all second strips 70 are substantially identical. When the first strips 66 are nested in the second slots 78 of the second strips 70, the first strips 66 extend parallel to each other. Similarly, when the second strips 70 are nested in the first slots 76 of the first strips 66, the second strips 70 extend parallel to each other. The second strips 70 extend perpendicularly to the first strips 66.

These nests of the first and second strips 66, 70 thus allow the production of the honeycomb core 12 (shown in FIG. 3d). The cells 18 of the honeycomb core 12 are defined by the intersections of the first strip 66 and the second strip 70. Thus, a cell 18 is defined by the intersection of two successive first strips 66 with two successive second strips 70. The parallelism of the first strips 66 and respectively the second strips 70 and the perpendicularity of the first and second strips 66, 70 allow the definition of cells 18 having a rectangular, and preferably square, shape. Cell 18 includes open ends at the outcrops of the first and second strips 66, 70 defining cell 18.

Advantageously, when the honeycomb core 12 is obtained by interlocking the first strips 66 and second strips 70, an adhesive is applied at the joining areas of the first and second strips 66, 70, in order to stiffen the honeycomb core 12 and to avoid dissociation of the first strips 66 and second strips 70 constituting the honeycomb core 12.

Optionally, before nesting the first and second strips 66, 70, adhesive can be applied to the bottom 80 and sides 82 of each of the first and second slots 66, 70.

When the honeycomb core 12 is produced and stiffened, debonding and pre-sintering is carried out on the parts obtained using the first, second, third and fourth walls 20, 22, 24, 26. The process is identical to that described in the first embodiment of the disclosure.

When debonding and pre-sintering have been completed, the third wall 24 and the fourth wall 26, forming the skins 14, are positioned on either side of the honeycomb core 12 so as to cover the open ends of the cells 18, as shown in FIG. 3e. The third wall 24 and the fourth wall 26 forming the skins 14 are attached to the honeycomb core 12 with an adhesive. Preferably, the adhesive is oxide ceramic glue. The oxide ceramic adhesive is applied to the surface of the third wall 24 and the surface of the fourth wall 26 coming into contact with the honeycomb core 12 and/or to the open ends of the cells 18 intended to come into contact with the third and fourth walls 24, 26.

The assembly of the skins 14 with the honeycomb core 12 makes it possible to produce an acoustic panel 10 according to the second embodiment.

Acoustic panel 10, according to the first and the second embodiment, is in the form of an annular sector. Several acoustic panels 10 can be arranged circumferentially end to end to form a ring of acoustic panels 10.

The invention claimed is:

1. A process for manufacturing a composite panel, comprising:
   obtaining a first wall, a second wall, a third wall and a fourth wall each formed of composite materials comprising an oxide matrix and long oxide fibers, the long oxide fibers being several kilometers long;
   from the first and second walls, forming a honeycomb core having a plurality of cells, each cell having a first end and an opposite second end, the forming comprising:
       forming the first wall so as to obtain a corrugated wall having alternating first and second apex portions interconnected by apex connecting portions; and
       cutting slots in said first apex portions and in said apex connecting portions of the first wall;
       making cuts in the second wall so as to obtain a plurality of strips; and
       inserting said strips into the slots of the first wall so as to delimit the plurality of cells, wherein the slots are cut in a substantially axial direction and opening in a direction normal to the corrugated wall; and covering said first and second ends of the cells of said honeycomb core with said third wall and said fourth wall, respectively, so as to close the ends of said cells.

2. The process according to claim 1, further comprising applying an adhesive to the junction areas of the first wall and the strips.

3. The process according to claim 1, comprising applying an adhesive to the areas of junctions of the honeycomb core with at least one of the third wall and the fourth wall.

4. The process according to claim 1, wherein the composite material is obtained by adding a binding slurry to biaxial or unidirectional fiber webs.

5. The process according to claim 1, wherein said at least one of the first wall, the second wall, the third wall and the fourth wall is obtained by thermoforming.

6. The process according to claim 1, wherein at least one of the first wall, the second wall, the third wall and the fourth wall is obtained by forming with the aid of an impression.

7. The process according to claim 1, further comprising bonding the third wall and the fourth wall to the honeycomb core, and at least one debonding step followed by a sintering step, said debonding and sintering steps configured to take place after at least one of the following steps:

obtaining one of the first, second, third or fourth walls;

making the cuts in the second wall so as to obtain the plurality of strips;

inserting the strips in said slots; or bonding the third wall and the fourth wall to the honeycomb core.

8. The process of claim 1, wherein at least one of the third wall and the fourth wall comprises perforations, each of the perforations opening into a cell of the plurality of cells.

9. The process according to claim 1, wherein the first apex portions and the second apex portions, together with the connecting portions of adjacent apices, define a trapezoidal shape without its largest base, the small base being defined by a first apex portion, respectively, and a second apex portion, the two non-parallel sides of the trapezium being defined by the apex connecting portions connected on either side to the apex portion forming the small base.

* * * * *